(12) United States Patent
Nickolls et al.

(10) Patent No.: US 9,639,479 B2
(45) Date of Patent: May 2, 2017

(54) INSTRUCTIONS FOR MANAGING A PARALLEL CACHE HIERARCHY

(75) Inventors: John R. Nickolls, Los Altos, CA (US); Brett W. Coon, San Jose, CA (US); Michael C. Shebanow, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1456 days.

(21) Appl. No.: 12/888,409

(22) Filed: Sep. 22, 2010

(65) Prior Publication Data

US 2011/0072213 A1    Mar. 24, 2011

Related U.S. Application Data

(60) Provisional application No. 61/245,222, filed on Sep. 23, 2009, provisional application No. 61/246,040, filed on Sep. 25, 2009.

(51) Int. Cl.
| | |
|---|---|
| *G06F 12/121* | (2016.01) |
| *G06F 12/0811* | (2016.01) |
| *G06F 12/0862* | (2016.01) |
| *G06F 9/30* | (2006.01) |

(52) U.S. Cl.
CPC ........ *G06F 12/121* (2013.01); *G06F 9/30043* (2013.01); *G06F 12/0811* (2013.01); *G06F 12/0862* (2013.01)

(58) Field of Classification Search
CPC . G06F 12/0811; G06F 12/0862; G06F 12/121

USPC .................................................. 711/120, 122
See application file for complete search history.

(56) References Cited

U.S. PATENT DOCUMENTS

| | | | |
|---|---|---|---|
| 6,877,086 B1 * | 4/2005 | Boggs et al. ................ | 712/218 |
| 2005/0055540 A1 * | 3/2005 | Hass et al. ................... | 712/214 |
| 2005/0091475 A1 | 4/2005 | Sodani | |
| 2005/0138295 A1 * | 6/2005 | Hammarlund et al. ...... | 711/137 |
| 2007/0079073 A1 * | 4/2007 | Rosenbluth et al. ......... | 711/134 |
| 2007/0239938 A1 | 10/2007 | Pong | |
| 2008/0133889 A1 | 6/2008 | Glew | |

OTHER PUBLICATIONS

International Search Report, PCT Appl. No. PCT/US 10/49978, mailed Jan. 6, 2011.
Koopman, P.: 18-548/15-548 Memory System Architecture, "4 Cache Organization", Carnegie Mellon University, ECE Department, Sep. 2, 1998, 8 pages. URL: https://www.ece.cmu.edu/~ece548/handouts/04cachor.pdf [called up on May 11, 2013].

(Continued)

*Primary Examiner* — Charles Rones
*Assistant Examiner* — Sidney Li
(74) *Attorney, Agent, or Firm* — Artegis Law Group, LLP

(57) ABSTRACT

A method for managing a parallel cache hierarchy in a processing unit. The method includes receiving an instruction from a scheduler unit, where the instruction comprises a load instruction or a store instruction; determining that the instruction includes a cache operations modifier that identifies a policy for caching data associated with the instruction at one or more levels of the parallel cache hierarchy; and executing the instruction and caching the data associated with the instruction based on the cache operations modifier.

20 Claims, 9 Drawing Sheets

(56) References Cited

OTHER PUBLICATIONS

Song Ho Ahn,: OpenGL, "OpenGL. Vertex Buffer Object (VBO)", 2005, pp. 1 to 4. URL: http://www.songho.ca/opengl/gl_vbo.html archived in http://www.archive.org on Jul. 9, 2009 [called up on May 11, 2013].

Silberstein, M. et al.: "Efficient Computation of Sum-products on GPUs Through Software-Managed Cache", Proceedings of the 22nd annual international conference on Supercomputing, ICS '08, New York, NY, USA: ACM, 2008, pp. 309 to 318.—ISBN 978-1-60558-158-3, http://doi.acm.org/10.1145/1375527.1375572 [called up on May 11, 2013].

Fu, Rao et al.: "A Study of the Performance Potential for Dynamic Instruction Hints Selection", Advances in Computer Systems Architecture, Lecture Notes in Computer Science. Berlin Heidelberg : Springer, 2006, pp. 67 to 80—ISBN 978-3-540-40056-1, http://dx.doi.org/10.1007/11859802_7 [called up on May 11, 2013].

Tumeo, A.: "Massively Parallel Computing with CUDA", In: OGF25/EGEE User Forum & OGF Europe's 2nd International Event, 2 to Jun. 3, 2009, pp. 1 to 32. Material for "OGF-EU Community Outreach Seminar: Software development tools for distributed computing", http://ww.ogf.org/OGF25/materials/1546/CUDA_Programming.pdf [called up on May 11, 2013].

\* cited by examiner

INSTRUCTIONS FOR MANAGING A PARALLEL CACHE HIERARCHY

CROSS-REFERENCE TO RELATED APPLICATIONS

This application claims benefit of U.S. provisional patent application Ser. No. 61/245,222, filed on Sep. 23, 2009, and U.S. provisional patent application Ser. No. 61/246,040, filed on Sep. 25, 2009.

BACKGROUND

Field of the Invention

Embodiments of the invention relate generally to multi-threaded processing and, more specifically, to a set of instructions that enable application software to manage a parallel cache hierarchy in a parallel thread processor.

Description of the Related Art

Conventional cache policy techniques attempt to determine a pattern of load and store operations in an effort to anticipate which data should be cached and/or evicted. However, in a highly multithreaded parallel processor, it can be extremely difficult to determine a pattern. For example, over 10,000 threads could be executing concurrently, making pattern detection difficult.

In addition, highly multithreaded parallel processors, such as graphics processing units (GPUs), have relatively small cache capacities per thread compared to serial processors such as CPU (central processing unit) cores.

Accordingly, what is needed in the art is a cache management technique that makes effective use of the limited caching capabilities of a multithreaded parallel processor.

SUMMARY

Embodiments of the invention provide instructions that enable parallel multithreaded application software to coordinate concurrent threads to efficiently use caches having a limited working-set capacity. Embodiments of the invention provide explicit cache behavior modifiers on load/store memory access instructions. The modifiers enable the programmer and/or compiler to specify cache optimizations for working set behavior, for streaming behavior, and for volatile and uncached behavior on specific load/store memory instructions.

One embodiment of the invention provides a method for managing a parallel cache hierarchy in a processing unit. The method includes receiving an instruction from a scheduler unit, where the instruction comprises a load instruction or a store instruction; determining that the instruction includes a cache operations modifier that identifies a policy for caching data associated with the instruction at one or more levels of the parallel cache hierarchy; and executing the instruction and caching the data associated with the instruction based on the cache operations modifier.

Advantageously, embodiments of the invention allow the programmer and/or compiler to specify at which cache levels data is to be cached. This allows for more efficient execution of programs and data access.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
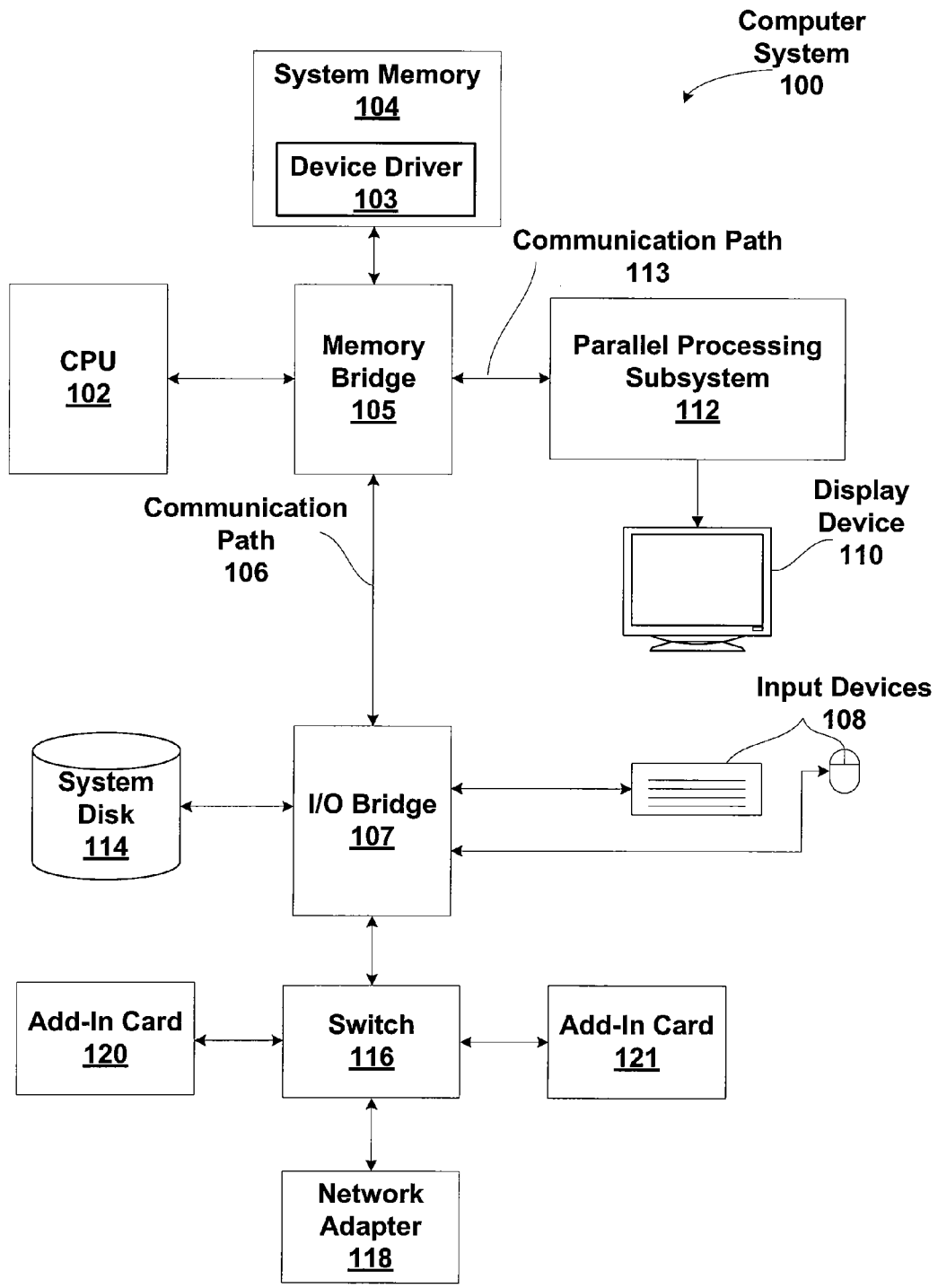
FIG. 1 is a block diagram illustrating a computer system configured to implement one or more aspects of the invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
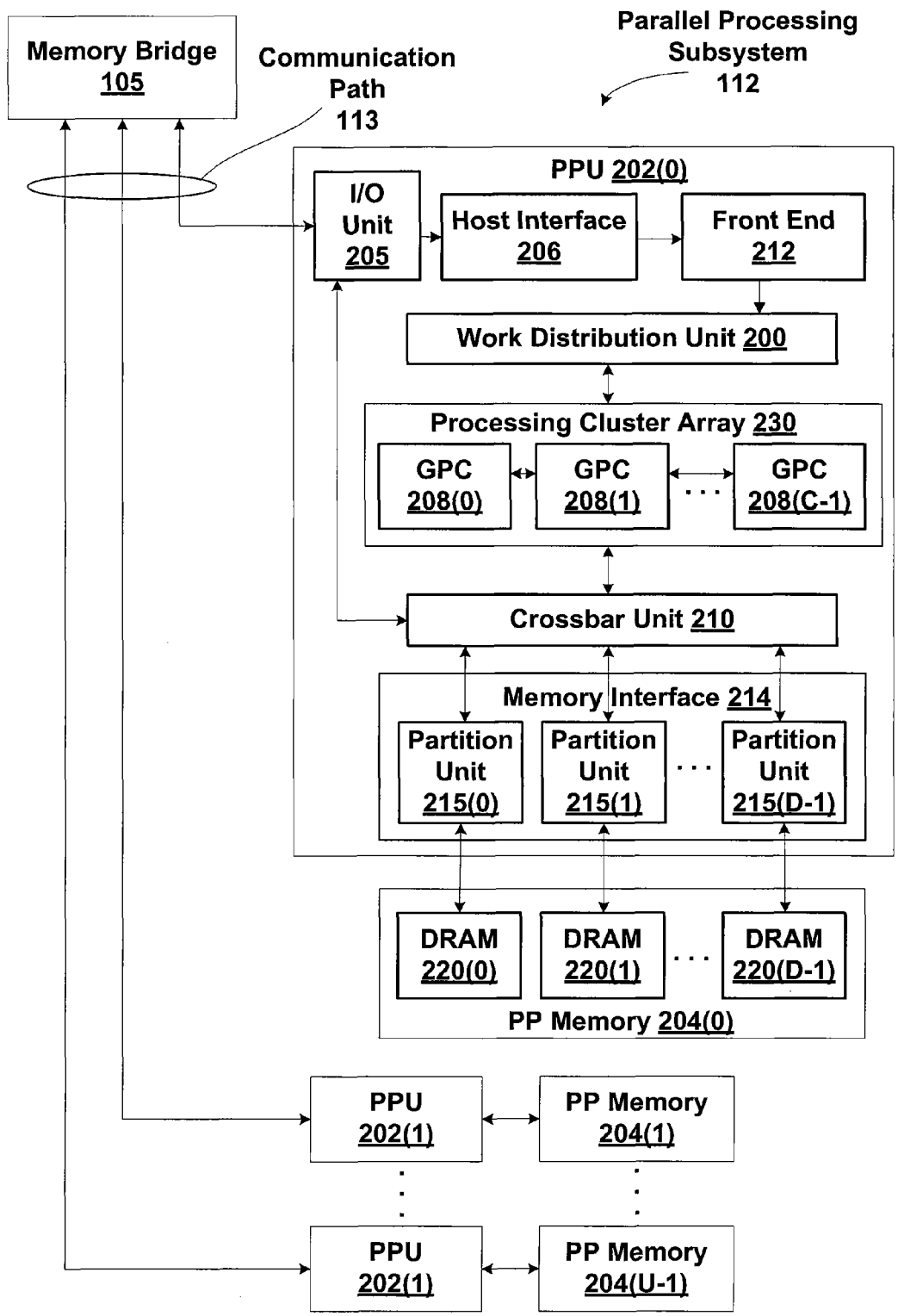
FIG. 2 is a block diagram of a parallel processing subsystem for the computer system of FIG. 1, according to one embodiment of the invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
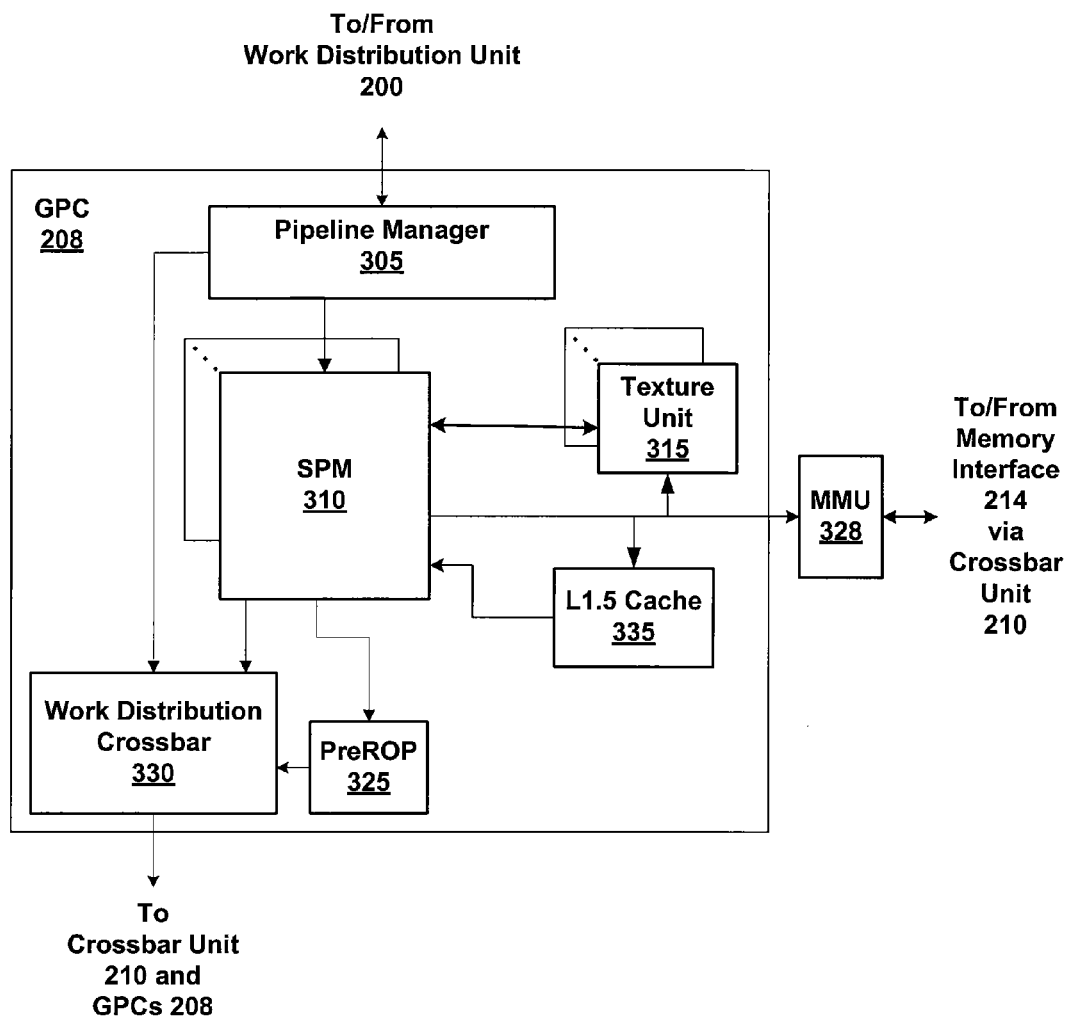
FIG. 3A is a block diagram of a GPC within one of the PPUs of FIG. 2, according to one embodiment of the invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
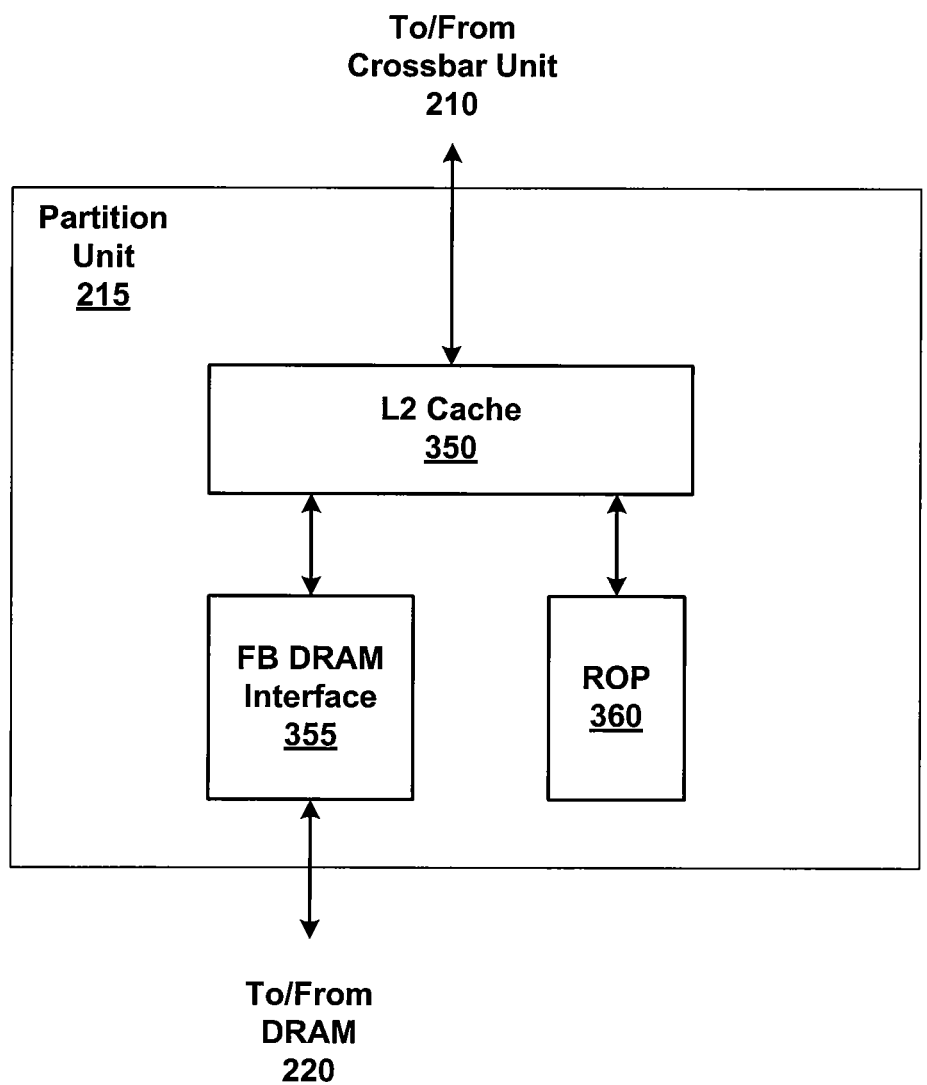
FIG. 3B is a block diagram of a partition unit within one of the PPUs of FIG. 2, according to one embodiment of the invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

Figure 3C:
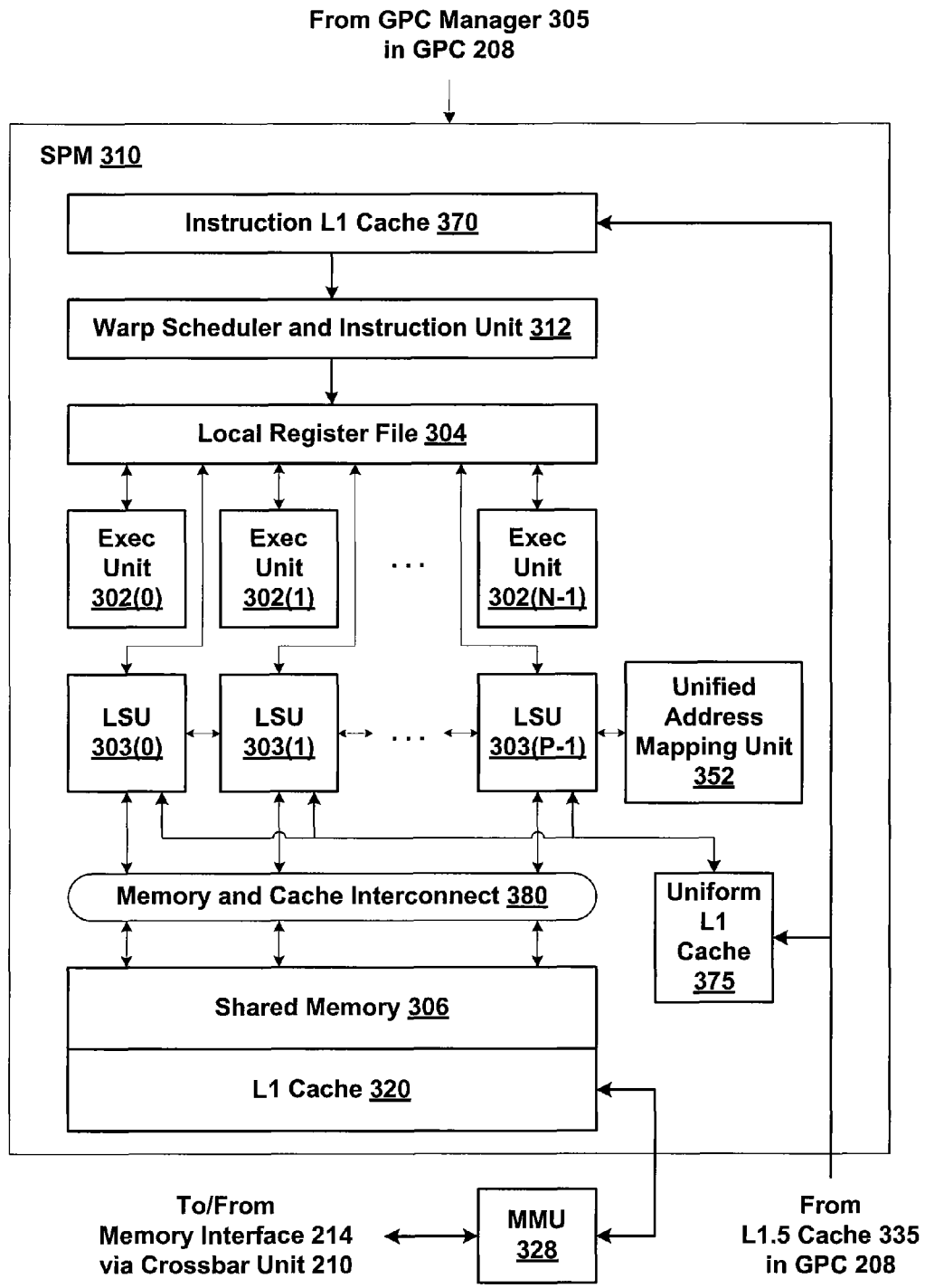
FIG. 3C is a block diagram of a portion of the SPM of FIG. 3A, according to one embodiment of the invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Figure 4:
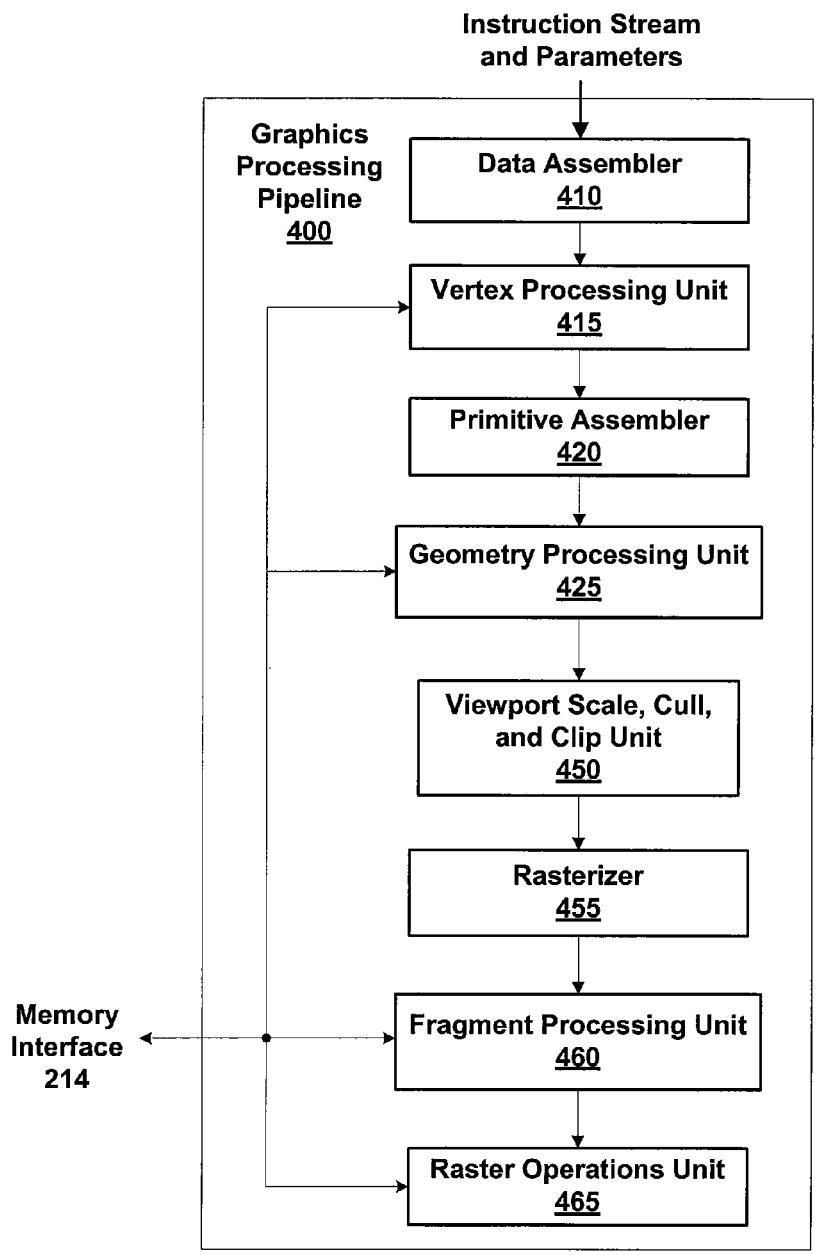
FIG. 4 is a conceptual diagram of a graphics processing pipeline that one or more of the PPUs of FIG. 2 can be configured to implement, according to one embodiment of the invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Although the method steps are described in conjunction with the systems of FIGS. 1, 2, 3A, 3B, and 3C, persons skilled in the art will understand that any system configured to perform the method steps, in any order, is within the scope of the inventions.

Instructions for Managing a Parallel Cache Hierarchy

Figure 5:
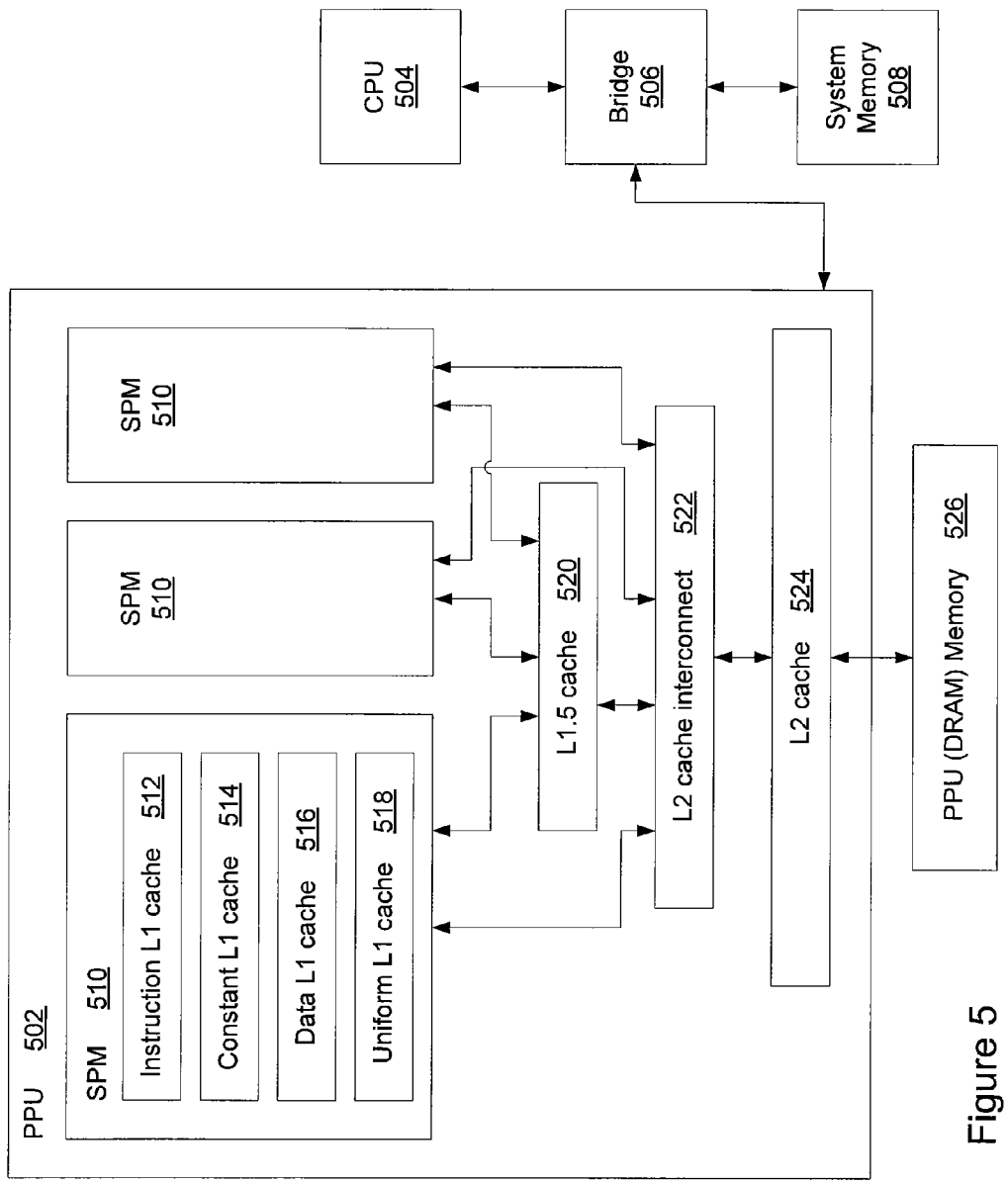
FIG. 5 is a conceptual diagram illustrating a parallel cache hierarchy in a parallel thread processor, according to one embodiment of the invention.

FIG. 5 is a conceptual diagram illustrating a parallel cache hierarchy in a parallel thread processor, according to one embodiment of the invention. As shown, a PPU 502 includes one or more SPMs 510. The PPU 502 is coupled to a PPU memory 526, which may comprise DRAM. The PPU 502 is also coupled to a bridge 506. The bridge 506 is coupled to a CPU 504 and a system memory 508. In one implementation, the PPU 502 is coupled to the CPU 504 and the system memory 508 via a PCI-Express link and the bridge 506.

As shown in FIG. 5, each SPM 510 includes an instruction L1 cache 512, a constant L1 cache 514, a data L1 cache 516, and/or a uniform L1 cache 518. The PPU also includes an L1.5 cache 520 coupled to each SPM 510. An L2 cache interconnect is coupled to each SPM 510, the L1.5 cache 520, and an L2 cache 524. The L2 cache 524 is coupled to the PPU memory 526.

In one embodiment, each PPU 502 is equivalent to PPU 202 shown in FIG. 2, and each SPM 510 is equivalent to SPM 310 shown in FIG. 3C. For example, the instruction L1 cache 512 is equivalent to the instruction L1 cache 370, the data L1 cache 516 is equivalent to the L1 cache 320, and the uniform L1 cache 518 is equivalent to the uniform L1 cache 375, as also shown in FIG. 3C. The L1.5 cache 520 may be equivalent to the L1.5 cache 335 shown in FIG. 3A. The L2 cache 524 may be equivalent to the L2 cache 330 shown in FIG. 3B.

The conceptual diagram illustrated in FIG. 5 shows just one implementation of a parallel cache hierarchy in a parallel thread processor architecture with a scalable number of thread processors called streaming multiprocessors (SPMs) 510. In one embodiment, a warp scheduler and instruction unit 312 also included in the SPM 510 provides instructions from parallel threads to the parallel execution units 302 and the parallel load-store units 303, as described in FIG. 3C.

In the embodiment shown in FIG. 5, each SPM 510 includes multiple different L1 caches: an L1 instruction cache 512, an L1 constant cache 514, an L1 data cache 516, and a uniform data L1 cache 518. The SPMs 510 and L1 caches share a unified L2 cache 524 via the cache interconnection network 522. In some embodiments, an additional cache layer is provided between the L1 caches and the L2 cache, i.e., the L1.5 cache 520.

The L2 cache 524 accesses the PPU DRAM memory 526, the system memory 508 via PCIe interface, and, optionally, additional peer device memory via the PCIe interface. An example of a peer device memory is the DRAM memory of another PPU attached to the same PCIe network.

The SPM load-store units (LSU) 303 (shown in FIG. 3C) execute memory access instructions including load, store, and cache control instructions listed below:

| | |
|---|---|
| ld{.cop}.sz rd, [ra + offset] ; | // load from memory |
| ldu.sz rd, [ra + offset] ; | // load via uniform cache |
| st{.cop}.sz [ra + offset], rb; | // store to memory |
| cctl.cache.op {rd,} [ra + offset] ; | // cache control operation |

As used herein, the term "load" describes instructions that read and return a value from memory, while the term "store" describes instructions that write a value to memory. Some instructions, such as atomic and locking operations, modify memory and return values, and should be considered to have both load and store semantics, and, therefore, follow both load and store rules.

The load instruction and store instruction "cache operations" (.cop) are described below. The cache control instruction cctl is also described below.

Cache Operations for Load and Store Instructions

The load and store instructions read or write memory at the effective address specified by the address operand. The .sz suffix specifies the size in bytes to read or write in memory, and the SPM instruction set architecture (ISA) may support 1-, 2-, 4-, 8-, and 16-byte sizes for load/store instructions. The effective memory address is the sum of register ra plus the immediate offset in bytes.

| | |
|---|---|
| ld{.cop}.sz rd, [ra + offset]; | // load rd from memory |
| st{.cop}.sz [ra + offset], rb; | // store rb to memory |

In some embodiments, the SPM 510 implements two versions of the memory access instructions using 32-bit addresses and 64-bit extended addresses designated with suffix .e (i.e., instructions la.e and st.e).

Load Instruction Cache Operations ld.cop

Load instructions have optional cache operations specified by .cop that the compiler and/or programmer can use to optimize cache usage on accesses to the global memory space and to local per-thread private memory space. Global and local memory accesses can map to PPU (DRAM) memory 526, system memory 508, and PCIe device memory, depending on the virtual to physical address mapping provided by system software and the PPU memory management unit (MMU) page table. In one implementation, accesses to the shared memory RAM ignore the cache operation, but an implementation that caches the shared memory space can use the cache operation.

The optional cache operations on loads ld{.cop} and ld.e{.cop} are:
.ca cache at all levels, likely to be accessed again (default)
.cg cache at global level (cache in L2 and below, not L1)
.cs cache streaming, likely to be accessed once, bypass cache or evict early
.lu last use: if the address is a per-thread Local address and the cache line is fully covered (all data in the cache line is accessed by the threads of the warp), load, then invalidate the line and cancel any pending dirty writeback, else load, and mark the cache line as evict first. Same .cop encoding as .cs.
.cv cache as volatile if address is in system memory; consider cached system memory lines stale, fetch again The default ld instruction cache operation is ld.ca, which allocates cache lines in all levels (L1 and L2) with normal eviction policy. In one embodiment, the application can use this instruction when the application expects to access the same cache line multiple times, and wants the accesses to hit in the working set of the L1 cache.

Global data is coherent at the L2 cache level, but in one implementation, the multiple L1 caches in each SPM are not coherent with each other for global data. If one thread stores to global memory via one L1 cache, and a second thread in a different SPM loads that address via a second L1 cache with ld.ca, the second thread may get stale L1 cache data, rather than the data stored by the first thread. The driver, therefore, invalidates global L1 cache lines between dependent grids of parallel threads. The program can also use the cache control instruction cctl to invalidate L1 cache lines, as described in greater detail below. Stores by the first grid program are then correctly fetched by the second grid program issuing default ld.ca loads cached in the L1 cache. This instruction supports alternate implementations that provide cache coherency among the multiple L1 caches. Alternatively, a program can bypass the L1 cache level with the ld.cg load cache global operation described below, to avoid fetching stale L1 data.

In one embodiment, the instruction ld.cg is used to cache loads only globally, bypassing the L1 cache and caching only at the global (L2 cache) level. An application program can use this instruction when it expects to read the address once, and reduces disruption of the working set in the relatively small L1 cache. This instruction enables communication between threads in different SPMs.

The ld.cs load cached streaming operation allocates global lines with evict-first policy in L1 and L2 to limit cache pollution by temporary streaming data that may be accessed once or twice. In another embodiment, the streaming data can bypass the L1 and L2 caches via a small stream cache or FIFO adjacent to each cache so that streaming data does not disturb the working set of L1 or L2. When ld.cs is applied to a local window address, it performs the ld.lu operation, described below.

The ld.lu load last use operation, when applied to a local private per-thread address, invalidates (i.e., discards and cancels any pending dirty writeback of the line if it is dirty from a prior store) the local L1 cache line following the load, if the line is fully covered (all the data in the cache line is read by the threads of the warp). The compiler and/or programmer may use ld.lu when restoring spilled registers and popping function stack frames to avoid needless writebacks of lines that will not be used again. The ld.lu instruction has the same cache operation .cop encoding as ld.cs, and performs a load cached streaming operation on global addresses.

The ld.cv load cached volatile operation applied to a global system memory address invalidates (i.e., discards) a matching L2 line and re-fetches the line on each new load, to allow the thread program to poll a system memory location written by the CPU.

A ld.cv applied to a PPU DRAM address is the same as ld.cs, evict-first, as shown in Table 1.

TABLE 1

| | LD.cop [global address] | | | | LD.cop [local address] | |
|---|---|---|---|---|---|---|
| .cop | L1 | L2 DRAM | L2 SysMem | .cop | L1 | L2 |
| .ca* | evict-norm | evict-norm | evict-norm | .ca* | evict-norm | evict-norm |
| .cg | non-cached [1] | evict-norm | evict-norm | .cg | evict-first | evict-norm |
| .cs | evict-first | evict-first | evict-first | .lu | last use [2] | evict-first |
| .cv | non-cached [1] | evict-first | fetch volatile [3] | .cv | evict-first | evict-first |

*Denotes default.
[1] L1 invalidates a matching line before a ld.cg or ld.cv. In this implementation, L1 is not coherent - it does not snoop global writes, so a matching L1 line may be stale. No record is left in L1 after a ld.cg or ld.cv.
[2] L1 will return local per-thread data and then invalidate the line and cancel a pending dirty writeback only if the line is fully covered (all its data is read by the threads of the warp); otherwise, it will return the line and leave it as evict-first.
[3] Load cache volatile ld.cv applied to System Memory invalidates a matching L2 line and re-fetches the line on each new load, to allow the thread program to poll a SysMem location written by the CPU. The L2 may coalesce a burst of loads to the same SysMem address. A ld.cv applied to a frame buffer DRAM address is the same as ld.cs, evict-first.

Store Instruction Cache Operations st.cop

Store instructions, similar to the load instructions described above, have optional cache operations specified by .cop that the compiler and programmer can use to optimize cache usage on accesses to the global memory space and to local per-thread private memory space.

The optional cache operations on stores st{.cop} and st.e{.cop} are:
.wb write back all coherent levels (default)
.cg cache at global level (cache in L2 and below, not L1)
.cs cache streaming, likely written once (bypass cache or evict early
.wt cache write-through (for addresses in system memory)

In one embodiment, cache operations are ignored on shared memory when the shared memory is implemented as a RAM. Cache operations to local memory may have different meanings than those for global memory.

The default st generic store cache operation is store write-back st.wb, which writes back cache lines of coherent cache levels with normal eviction policy. Data stored to local per-thread memory is cached in the L1 cache and the L2 cache with write-back. However, in one embodiment, global store data in L1 is not cached because multiple L1 caches are not coherent for global data. Global stores bypass the L1 cache and discard any L1 cache lines that match, regardless of the .cop cache operation. Other embodiments may provide globally-coherent L1 caches and st.wb could write-back dirty global store data from the L1 cache.

In one embodiment shown in Table 2, if one thread stores to global memory, bypassing its L1 cache, and a second thread in a different SPM later loads from that address via a different L1 cache with ld.ca, the second thread may get a hit on stale L1 cache data, rather than get the data from L2 or memory stored by the first thread. Accordingly, the driver must invalidate global L1 cache lines between dependent grids of thread arrays. Stores by the first grid program are then correctly missed in the L1 cache and fetched by the second grid program issuing default ld.ca loads.

The cache operation st.cg cache-global can be used to cache global store data only globally, bypassing the L1 cache, and cache only in the L2 cache. In one implementation shown in Table 2, the st.cg cache global policy is also used for the st.wb instruction for global data, but st.cg to local memory uses the L1 cache, and marks local L1 lines evict-first.

The st.cs store cached-streaming operation allocates cache lines with evict-first policy in the L2 cache (and the L1 cache if local) to limit cache pollution by streaming output data; global streaming data bypasses the L1. Since programs issue streaming writes once, another implementation of st.cs is to have streaming data bypass the L1 and L2 caches via a small stream cache or FIFO adjacent to each cache, so that streaming data does not disturb the working set of the L1 cache or the L2 cache.

The st.wt store write-through operation applied to a global system memory address writes through the L2 cache, to allow a CPU program to poll a system memory location written by the PPU with st.wt. In one implementation, addresses not in system memory use normal L2 write-back.

One embodiment of store instruction cache operations uses the cache operation policies shown in Table 2.

TABLE 2

| | ST.cop [Global address] | | | | ST.cop [Local address] | |
|---|---|---|---|---|---|---|
| .cop | L1 | L2 DRAM | L2 SysMem | .cop | L1 | L2 |
| .wb* | non-cached [1] | evict-norm | evict-norm | .WB* | evict-norm | evict-norm |
| .cg | non-cached [1] | evict-norm | evict-norm | .CG | evict-first | evict-norm |
| .cs | non-cached [1] | evict-first | evict-first | .CS | evict-first | evict-first |
| .wt | non-cached [1] | evict-first | write-through [2] | .WT | evict-first | evict-first |

*Denotes default.
[1] In this embodiment, global data stores bypass the L1. L1 does not cache global store data; it does cache local per-thread data. L1 discards a matching global line before a ST to global, because global L1 lines cannot be dirty. L1 is not globally coherent - it does not snoop global stores, so a matching L1 line may be stale. No record is left in L1 after a ST to global.
[2] Store Write-Through (st.wt) applied to global System Memory writes through the L2 cache line to System Memory, to allow the CPU to poll a SysMem location written by the GPU with st.wt. The L2 does not coalesce a burst of write-through stores to the same SysMem address; it writes each one through to SysMem. A st.wt applied to a PPU memory (204) frame buffer DRAM address is the same as st.cs, streaming evict-first, write-back.

Cache Control Instruction cctl.cache.op

The cache control instructions cctl.cache.cop and cctll.cop control or query a cache line that contains a specified unified or local per-thread address.

```
CCTL{.E}{.cache}.cop [Ra + ImmS32]; // Cache control, unified address
CCTLL.cop{.S}      [Ra + ImmS24]; // Cache control, Local address
```

The cctl.cache cache hierarchy specifiers are:
.d data cache hierarchy L1, L2 (default if omitted)
.u uniform cache hierarchy L1, L1.5, L2
.c constant cache hierarchy L1, L1.5, L2
.i instruction cache hierarchy L1, L1.5, L2
.t texture cache hierarchy L1, L2
The cctl.cop cache operation specifiers are:
.qry1 write Rd with line status (valid, dirty) of L1
.pf1 pre-fetch line into L1 cache
.pf1.5 pre-fetch line into L1.5 cache .pf2 pre-fetch line into L2 cache
.wb write back dirty cache line (flush to memory)
.iv invalidate cache line (if dirty, first write back)
.ivall invalidate all cache lines (if dirty, write back)
.rs reset line, mark invalid without prior invalidate The byte address is computed as the sum of register Ra plus the signed immediate offset ImmS32 (or ImmS24), which is then zero-extended to 40-bits. If the .e extension is specified, the unified byte address is computed as the sum of the 64-bit value (R[a+1], R[a]) plus the sign-extended immediate offset ImmS32. The effective address is interpreted within the cache address space specified by cctl.cache.

There are several cached address spaces that can be controlled or queried with cctl: data addresses, uniform global addresses, constant addresses, instruction addresses, and in some embodiments, texture addresses. Use a unified generic thread byte address for the .d and .u cache hierarchies. Use a constant bank and offset within bank for the .c cache hierarchy [bank][offset]. Use an instruction byte address for the .i cache hierarchy. Use a texture or global address for the .t cache hierarchy.

The cctl instruction controls or queries the cache line that contains the supplied address. cctl.qry1 writes destination register rd; other cctl.cop operations do not write rd, and must omit rd. Omitted rd is assembled as rz (null destination).

Local memory cctll does not use a .cache specifier; its addresses are within the Local data space. cctll evaluates the effective per-thread local address of [Ra+ImmS24] within the Local space and performs operation .cop on the selected Local data cache line. The cctls instruction name is reserved in the event that shared memory becomes cacheable. Some embodiments use the cctlt name for texture cache control.

cctl.d.ivall does not take an address; it invalidates all global lines in the L1 data cache. Similarly, cctl.u.ivall does not take an address; it invalidates all global lines in the uniform L1 cache and L1.5 cache. Local memory cctll ivall invalidates all local lines in the L1 data cache, after writing back any dirty lines.

cctl{l}.qry1 writes rd with the addressed cache line status in this format:

| bit | description |
| --- | --- |
| 0 | L1 line valid: 0 = invalid, 1 = valid |
| 1 | L1 line dirty: 0 = invalid or clean, 1 = dirty |
| 31:2 | 0 |

Alternate embodiments of cctl(l).qry1 write the query result in one or more predicate registers.

The instruction and constant caches are read-only. Write back to read-only caches are ignored. Prefetch operations quietly ignore invalid addresses or addresses with MMU translation errors.

The cctl.d and cctl.u operations apply to the unified generic address space. Addresses located in the local or shared memory windows are transformed as described in id; any errors related to addressing do not result in a reported error.

The cache control prefetch instructions do not report errors. That permits a program to request a cache line prefetch using an address that may be invalid, which can occur when a compiler moves a prefetch earlier in the program to start it earlier.

Figure 6:
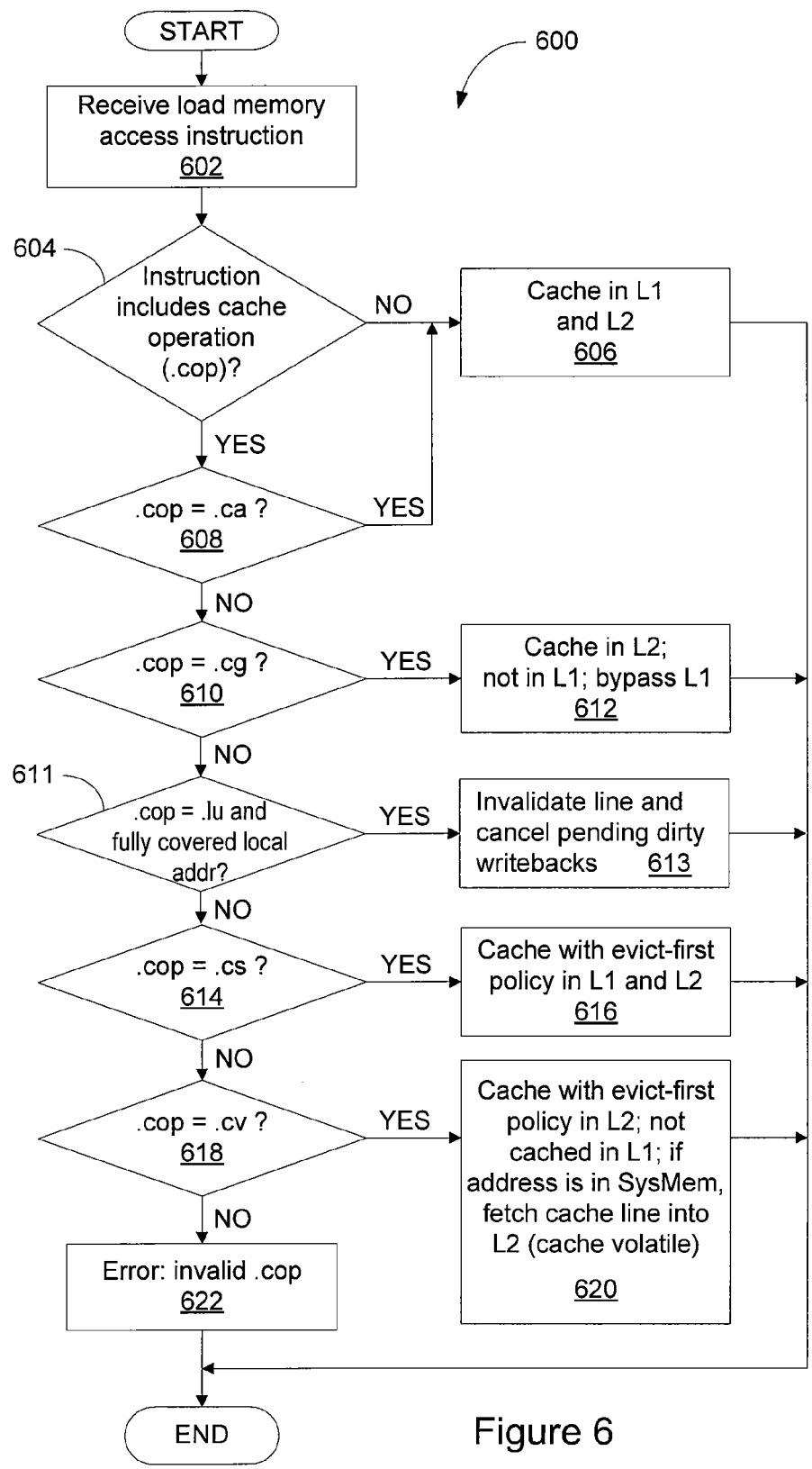
FIG. 6 is a flow diagram of method steps for processing a load memory access instruction, according to one embodiment of the invention.

FIG. 6 is a flow diagram of method steps for processing a load memory access instruction, according to one embodiment of the invention. Persons skilled in the art will understand that, even though the method 600 is described in conjunction with the systems of FIGS. 1-5, any system configured to perform the method steps, in any order, is within the scope of embodiments of the invention. The flow diagram in FIG. 6 describes the cache operations of the L1 and L2 caches upon execution of a "load" memory access instruction to a global memory address.

As shown, the method 600 begins at step 602, where a load-store unit (LSU) included in an SPM receives a "load" memory access instruction. At step 604, the LSU determines whether the memory access instruction includes a cache operations (.cop) modifier. If the LSU determines that the memory access instruction does not include a .cop modifier (i.e., default memory access instruction), then the method 600 proceeds to step 606. At step 606, the LSU causes data associated with the memory access instruction to be cached in both the L1 and L2 caches with normal eviction policies.

If, at step 604, the LSU determines that the memory access instruction does include a .cop modifier, then the method 600 proceeds to step 608. At step 608, the LSU determines whether the .cop is equal to ".ca" (i.e., cache all). If the LSU determines that the .cop is equal to ".ca," then the method 600 proceeds to step 606, described above. If the LSU determines that the .cop is not equal to ".ca," then the method 600 proceeds to step 610.

At step 610, the LSU determines whether the .cop is equal to ".cg" (i.e., cache global). If the LSU determines that the .cop is equal to ".cg," then the method 600 proceeds to step 612. At step 612, the LSU causes the data associated with the memory access instruction to be cached in only the L2 cache with normal eviction policy and to not be cached in the L1 cache. As described above, L1 invalidates a matching line before a ld.cg or ld.cv instruction. In one implementation, L1 is not coherent—it does not snoop global writes, so a matching L1 line may be stale. No record is left in L1 after a ld.cg or ld.cv. If, at step 610, the LSU determines that the .cop is not equal to ".cg," then the method 600 proceeds to step 611.

At step 611, the LSU determines whether the .cop is equal to ".lu" (i.e., "last use") and the address is a local per-thread address and the line is fully covered (the threads in the warp load all the data in the local cache line). If the LSU determines that that the .cop is equal to ".lu" and the address is a fully covered local address, then the method 600 proceeds to step 613. At step 613, after loading the "last use" data, the LSU invalidates the cache line and cancels any pending dirty cache line write-back, then the method 600. If the LSU determines that that the .cop is not equal to ".lu" and/or the address is not a fully covered local address, then the method 600 proceeds to step 614.

At step 614, the LSU determines whether the .cop is equal to ".cs" (i.e., cache streaming). If the LSU determines that the .cop is equal to ".cs," then the method 600 proceeds to step 616. At step 616, the LSU causes data associated with the memory access instruction to be cached in both the L1 and L2 caches with "evict-fist" eviction policies. In one implementation, this data is only going to be read once, used once, and never used again, and can bypass the L1 and L2 caches in a streaming cache or FIFO. If, at step 614, the LSU determines that the .cop is not equal to ".cs," then the method 600 proceeds to step 618.

At step 618, the LSU determines whether the .cop is equal to ".cv" (i.e., cache volatile). If the LSU determines that the .cop is equal to ".cv," then the method 600 proceeds to step 620. At step 620, the LSU causes the data associated with the memory access instruction to be cached in the L2 cache with an evict-first eviction policy and to not be cached in the L1 cache. If the address is in system memory, the L2 ignores any previously cached L2 data and always fetches the line from system memory, to implement the "cache volatile" policy. If, at step 618, the LSU determines that the .cop is not equal to ".cv," then the method 600 proceeds to step 622. At 622, the LSU determines that the .cop is invalid and returns an error.

Figure 7:
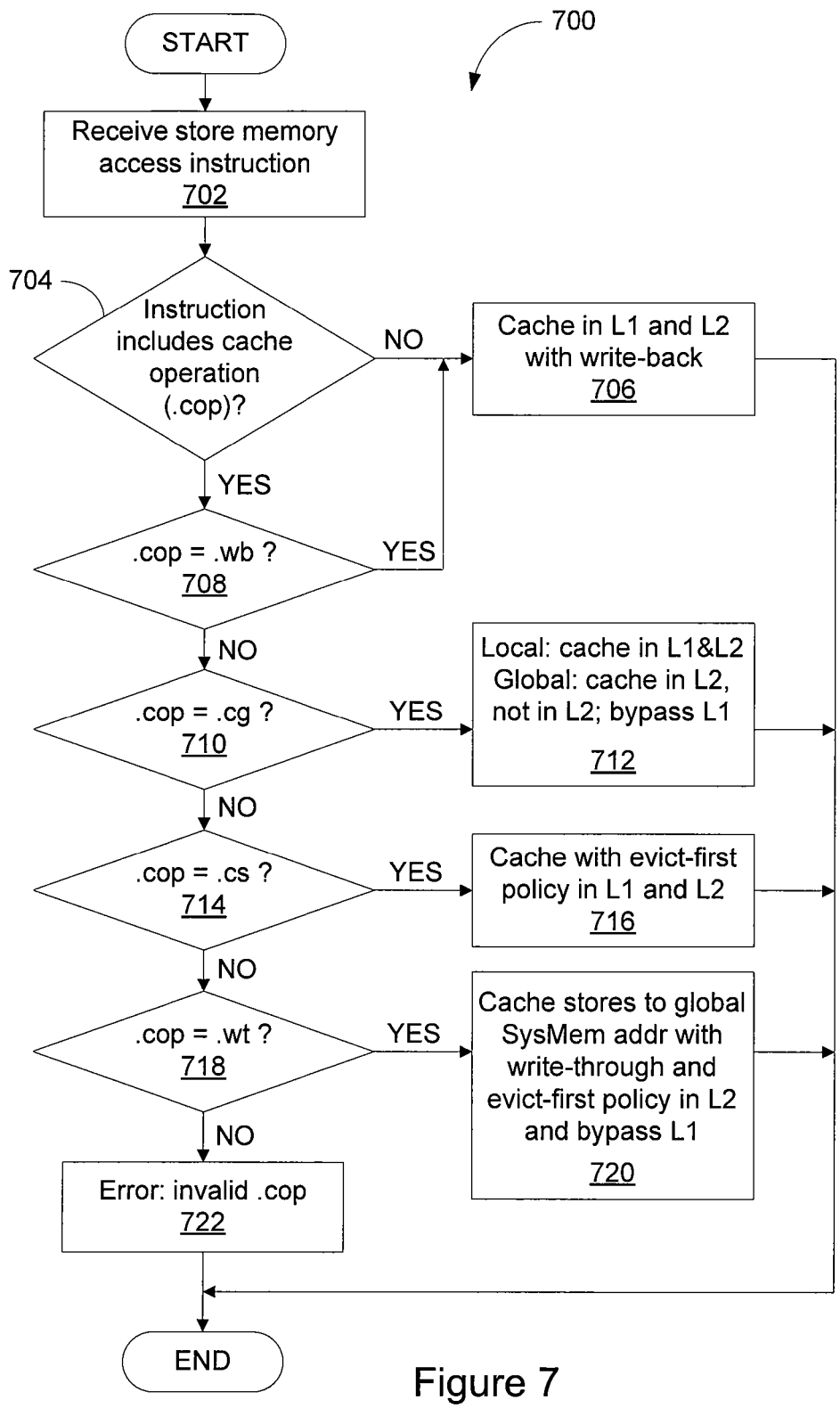
FIG. 7 is a flow diagram of method steps for processing a store memory access instruction, according to one embodiment of the invention.

FIG. 7 is a flow diagram of method steps for processing a store memory access instruction, according to one embodiment of the invention shown in Table 2. Persons skilled in the art will understand that, even though the method 700 is described in conjunction with the systems of FIGS. 1-5, any system configured to perform the method steps, in any order, is within the scope of embodiments of the invention.

The flow diagram in FIG. 7 describes the cache operations of the L1 and L2 caches upon execution of a "store" memory access instruction to a global memory address. As shown, the method 700 begins at step 702, where a load-store unit (LSU) included in an SPM receives a "store" memory access instruction. At step 704, the LSU determines whether the memory access instruction includes a cache operations (.cop) modifier. If the LSU determines that the memory access instruction does not include a .cop modifier (i.e., default memory access instruction), then the method 700 proceeds to step 706. At step 706, which implements the default and write-back policies for stores, the LSU causes data associated with the memory access instruction at addresses that are cached coherently to be cached with a write-back policy in both the L1 and L2 caches with normal eviction policies. In the embodiment shown in Table 1 and Table 2, stores to local per-thread addresses are coherent and thus are cached in L1 and L2 with a write-back policy, while stores to global addresses bypass the L1 and invalidate a matching cache line in L1, and are cached only in L2 with write-back.

If, at step 704, the LSU determines that the memory access instruction does include a .cop modifier, then the method 700 proceeds to step 708. At step 708, the LSU determines whether the .cop is equal to ".wb" (i.e., write back). If the LSU determines that the .cop is equal to ".wb," then the method 700 proceeds to step 706, described above. If the LSU determines that the .cop is not equal to ".wb," then the method 700 proceeds to step 710.

At step 710, the LSU determines whether the .cop is equal to ".cg" (i.e., cache global). If the LSU determines that the .cop is equal to ".cg," then the method 700 proceeds to step 712. At step 712, the LSU causes the data associated with the memory access instruction for per-thread local addresses to be cached in both the L2 cache with normal eviction policy, and for global addresses to bypass the L1 and to not be cached in the L1 cache. If, at step 710, the LSU determines that the .cop is not equal to ".cg," then the method 700 proceeds to step 714.

At step 714, the LSU determines whether the .cop is equal to ".cs" (i.e., cache streaming). If the LSU determines that the .cop is equal to ".cs," then the method 700 proceeds to step 716. At step 716, the LSU causes data associated with the memory access instruction for per-thread local addresses to be cached in both the L1 and L2 caches with "evict-fist" eviction policies, and for global addresses to bypass the L1 and not be cached in the L1 cache. Store with streaming cache policy means this data is only going to be stored once. If, at step 714, the LSU determines that the .cop is not equal to ".cs," then the method 700 proceeds to step 718.

At step 718, the LSU determines whether the .cop is equal to ".wt" (i.e., write through). If the LSU determines that the .cop is equal to ".wt," then the method 700 proceeds to step 720. At step 720, the LSU causes the data associated with the memory access instruction at a global system memory address to be cached in the L2 cache with a write-through policy and an evict-first eviction policy and to not be cached in the L1 cache. If, at step 718, the LSU determines that the .cop is not equal to ".wt," then the method 700 proceeds to step 722. At step 722, the LSU determines that the .cop is invalid and returns an error.

In sum, embodiments of the invention provide instructions that enable parallel multithreaded application software to coordinate concurrent threads to efficiently use caches having a limited working-set capacity. Embodiments of the invention provide explicit cache behavior modifiers on load/store memory access instructions. The modifiers enable the programmer and/or compiler to specify cache optimizations for working set behavior, for streaming behavior, and for volatile and uncached behavior on specific load/store memory instructions.

Advantageously, embodiments of the invention allow the programmer and/or compiler to specify a caching policy and at which cache levels data is to be cached. This allows for more efficient execution of programs and data access.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for managing a parallel cache hierarchy in a processing unit, the method comprising:
   receiving an instruction from a scheduler unit, wherein the instruction comprises a load instruction or a store instruction, and wherein the instruction is associated with an address that identifies a memory region;
   determining that the instruction includes a cache operations modifier that identifies a policy for caching data associated with the instruction at one or more levels of the parallel cache hierarchy; and
   executing the instruction and caching the data associated with the instruction based on the cache operations modifier, wherein the data is cached if the address is in a local memory region, and the data is not cached if the address is in a global region.

2. The method of claim 1, wherein the parallel cache hierarchy includes an L1 cache level and an L2 cache level.

3. The method of claim 2, wherein each processor included in the processing unit includes a different L1 cache at the L1 cache level, the L2 cache level includes at least one L2 cache that each processor is configured to access.

4. The method of claim 2, wherein the cache operations modifier is implemented to cause the data associated with the instruction to be cached at both the L1 cache level and the L2 cache level.

5. The method of claim 4, wherein the data associated with the instruction is cached at each of the L1 cache level and the L2 cache level with an evict-first eviction policy.

6. The method of claim 2, wherein the cache operations modifier is implemented to invalidate and discard the data cached in the L1 cache following a load instruction.

7. The method of claim 2, wherein the cache operations modifier is implemented to cause the data associated with the instruction to be cached at the L2 cache level and not cached at the L1 cache level.

8. The method of claim 7, wherein the data associated with the instruction is cached at the L2 cache level with an evict-first eviction policy.

9. The method of claim 1, wherein the cache operations modifier is implemented to cause data associated with a store instruction to be cached with a write-back policy or a write-through policy.

10. The method of claim 1, wherein the cache operations modifier is implemented to cause data associated with a load instruction to be cached with a volatile fetch-always policy.

11. A system for managing a parallel cache hierarchy, the system comprising:
a processor, configured to:
receive an instruction that comprises a load instruction or a store instruction, wherein the instruction is associated with an address that identifies a memory region,
determine that the instruction includes a cache operations modifier that identifies a policy for caching data associated with the instruction at one or more levels of the parallel cache hierarchy; and
execute the instruction and cache the data associated with the instruction based on the cache operations modifier, wherein the data is cached if the address is in a local memory region, and the data is not cached if the address is in a global region.

12. The system of claim 11, wherein the parallel cache hierarchy includes an L1 cache level and an L2 cache level.

13. The system of claim 12, wherein each processor included in the processing unit includes a different L1 cache at the L1 cache level, the L2 cache level includes at least one L2 cache that each processor is configured to access.

14. The system of claim 12, wherein the cache operations modifier is implemented to cause the data associated with the instruction to be cached at both the L1 cache level and the L2 cache level.

15. The system of claim 14, wherein the data associated with the instruction is cached at each of the L1 cache level and the L2 cache level with an evict-first eviction policy.

16. The system of claim 12, wherein the cache operations modifier is implemented to invalidate and discard the data cached in the L1 cache following a load instruction.

17. The system of claim 12, wherein the cache operations modifier is implemented to cause the data associated with the instruction to be cached at the L2 cache level and not cached at the L1 cache level.

18. The system of claim 17, wherein the data associated with the instruction is cached at the L2 cache level with an evict-first eviction policy.

19. The system of claim 11, wherein the cache operations modifier is implemented to cause data associated with a store instruction to be cached with a write-back policy or a write-through policy.

20. The system of claim 11, wherein the cache operations modifier is implemented to cause data associated with a load instruction to be cached with a volatile fetch-always policy.

* * * * *